US010259084B2

(12) United States Patent
Veenstra et al.

(10) Patent No.: US 10,259,084 B2
(45) Date of Patent: Apr. 16, 2019

(54) FURNACE COOLING SYSTEM WITH THERMALLY CONDUCTIVE JOINTS BETWEEN COOLING ELEMENTS (71) Applicant: HATCH LTD., Mississauga (CA)

(72) Inventors: Robert J. Veenstra, Thamesford (CA); David Henry Rudge, Burlington (CA); Maciej Urban Jastrzebski, Mississauga (CA); John Andrew Ferguson Shaw, Toronto (CA)

(73) Assignee: Hatch Ltd., Mississauga (CA)

(*) Notice: Subject to any disclaimer, the term of this patent is extended or adjusted under 35 U.S.C. 154(b) by 145 days.

(21) Appl. No.: 15/027,912

(22) PCT Filed: Oct. 8, 2014

(86) PCT No.: PCT/CA2014/050971
§ 371 (c)(1),
(2) Date: Apr. 7, 2016

(87) PCT Pub. No.: WO2015/051455
PCT Pub. Date: Apr. 16, 2015

(65) Prior Publication Data
US 2016/0250726 A1 Sep. 1, 2016

Related U.S. Application Data (60) Provisional application No. 61/888,294, filed on Oct. 8, 2013.

(51) Int. Cl.
B23P 6/04 (2006.01)
F27D 1/00 (2006.01)
(Continued)

(52) U.S. Cl.
CPC ............... B23P 6/04 (2013.01); C21B 7/106 (2013.01); C21C 5/4646 (2013.01); F27B 14/08 (2013.01);
(Continued)

(58) Field of Classification Search
CPC .. F27D 9/00; F27D 1/0003; F27D 2009/0013; F27D 2009/0018; B23P 6/04;
(Continued)

(56) References Cited

U.S. PATENT DOCUMENTS 4,295,001 A 10/1981 Britton
4,441,726 A 4/1984 Uhl
(Continued)

FOREIGN PATENT DOCUMENTS

CA 2384455 3/2001
CN 1142309 A 2/1997
(Continued)

Primary Examiner — Scott R Kastler
Assistant Examiner — Michael Aboagye
(74) Attorney, Agent, or Firm — DeLio, Peterson & Curcio, LLC; Thomas E. Ciesco (57) ABSTRACT Supplementary cooling elements in addition to a primary cooling element of a furnace. The supplementary cooling elements, with two or more components, may be inserted from the outside of the furnace into holes that pass through and the primary cooling element such that the cooling elements protrude beyond the inner surface of the primary cooling element. An inner one of the components of the supplementary cooling element may be received by an outer one of the components in a manner that forces the outer component into a thermally conductive pressure connection with the primary cooling element.

18 Claims, 7 Drawing Sheets (51) Int. Cl.
*F27D 9/00* (2006.01)
*F27B 14/08* (2006.01)
*C21B 7/10* (2006.01)
*C21C 5/46* (2006.01)

(52) U.S. Cl.
CPC ............. *F27D 1/0003* (2013.01); *F27D 9/00* (2013.01); *F27B 2014/0837* (2013.01); *F27D 2001/0046* (2013.01); *F27D 2009/0013* (2013.01); *F27D 2009/0018* (2013.01); *F27D 2009/0032* (2013.01); *F27D 2009/0043* (2013.01); *F27D 2009/0048* (2013.01); *F27D 2009/0051* (2013.01); *F27D 2009/0062* (2013.01)

(58) Field of Classification Search
CPC ....... C21B 7/106; C21C 5/4646; F27B 14/08; F27B 2014/0837
USPC ................. 266/193, 194, 282, 283; 373/76
See application file for complete search history.

(56) References Cited

U.S. PATENT DOCUMENTS

| | | | |
|---|---|---|---|
| 5,406,580 A | | 4/1995 | McCaffrey |
| 7,465,422 B2* | | 12/2008 | Saarinen .................. C21B 7/10 266/193 |
| 8,920,709 B2* | | 12/2014 | Maggioli .................. C21B 7/10 266/194 |
| 8,945,465 B2* | | 2/2015 | Reeves .................. B22D 41/00 266/275 |
| 9,347,708 B2* | | 5/2016 | Southall .................... F27D 1/12 |
| 9,863,707 B2* | | 1/2018 | Southall .................... F27D 1/12 |
| 2012/0043065 A1 | | 2/2012 | Ranne et al. |
| 2013/0008636 A1 | | 1/2013 | Smith |

FOREIGN PATENT DOCUMENTS

| | | |
|---|---|---|
| CN | 1675382 | 9/2005 |
| CN | 1926923 A | 3/2007 |
| CN | 201348443 | 11/2009 |
| CN | 201359438 | 12/2009 |
| CN | 201540027 | 8/2010 |
| CN | 203501803 U | 3/2014 |
| EP | 0443201 A1 | 8/1991 |
| EP | 1826518 | 8/2007 |
| FR | 2097192 | 3/1972 |
| GB | 1161564 | 8/1969 |
| GB | 2023783 | 1/1980 |
| JP | H11323415 | 11/1999 |
| KR | 20100112822 | 10/2010 |
| RU | 2452912 A | 3/2012 |
| SU | 59706 A1 | 11/1940 |
| WO | WO2012/107322 | 8/2012 |
| WO | WO2012107322 | 8/2012 |

* cited by examiner

FURNACE COOLING SYSTEM WITH THERMALLY CONDUCTIVE JOINTS BETWEEN COOLING ELEMENTS

BACKGROUND OF THE INVENTION

1. Field of the Invention

The present application relates generally to cooling systems for furnaces and, more specifically, to cooling elements that are thermally connected together with a thermally conductive joint.

2. Description of Related Art

Cooling elements are installed on the interior surface of a smelting or blast furnace shell to keep the shell cool and, thereby, maintain structural integrity of the shell. Cooling elements are typically metal fabrications incorporating one or more passages. A liquid, typically water, is circulated through these passages to remove heat from the cooling element. Blast furnace cooling has historically been achieved by installing alternating layers of refractory material and horizontally oriented plate-type cooling elements (plate coolers). Horizontal plate coolers form ledges on which a protective layer of stagnant burden is supported, thereby protecting the coolers from wear. Due to their ability to retain accretion, plate coolers in combination with refractory linings have a long life in the high-intensity zone of a furnace, typically around 20 years. Plate coolers also provide stable furnace operation. However, plate coolers also have a relatively low capacity for heat removal and have a large footprint, thereby taking up significant volume within a furnace shell. Horizontal plate coolers are disclosed, for example, in U.S. Pat. No. 3,849,587.

SUMMARY OF THE INVENTION

According to an aspect of the present disclosure, there is provided a supplementary cooling element for use in conjunction with a primary (stave-type) cooling element to remove heat from the primary cooling element, for example if the primary cooling element has insufficient cooling. The supplementary cooling element includes a first component and a second component defining a passage sized to receive the first component, the second component having exterior dimension arranged for being received within an aperture in the primary cooling element having an interior wall. A movement of one of the first component and the second component relative to the other creates a change in the exterior dimension of the second component of the supplementary cooling element, thereby causing a thermally conductive pressure connection to be formed between the second component and the interior wall of the aperture in the primary cooling element.

Heat can be absorbed from the furnace through the primary cooling element and then transmitted to the supplementary cooling element through the thermally conductive joint for removal from the furnace. It is possible to install these supplementary cooling elements concurrently with the primary cooling elements, or at a later date from outside of the furnace, for example after the primary cooling elements have been damaged.

According to an aspect of the present disclosure, there is provided a supplementary cooling element for use in conjunction with a primary cooling element. The supplementary cooling element includes a first component containing a passage into which a fluid is circulated for the purposes of removing heat and a second component defining a passage sized to receive the first component, the second component having exterior dimension arranged for being received within an aperture in the primary cooling element, the aperture having an interior wall. A movement of one of the first component and the second component relative to the other of the first component and the second component creates a change in the exterior dimension of the second component, thereby causing: a thermally conductive pressure connection to be formed between the first component and the second component; and a thermally conductive pressure connection to be formed between the second component and the interior wall of the aperture in the primary cooling element.

According to an aspect of the present disclosure, there is provided a device for use in conjunction with two cooling elements. The device includes a first component; and a second component, wherein a movement of one of the first component and the second component relative to the other of the first component and the second component creates a change in the exterior dimension of the device, thereby causing a thermally conductive pressure connection to be formed between the two cooling elements via the first component and the second component.

According to an aspect of the present disclosure, there is provided a method of repairing a furnace wall assembly, the furnace wall assembly having a structural steel plate. The method includes cutting through the structural steel shell plate to form a first aperture in a manner such that a second aperture, cut into in a stave cooler, aligns with the first aperture. The method also includes inserting a first component into the aligned first and second apertures, the first component defining a first component passage, the first component having exterior dimension arranged for being received within the second aperture, the second aperture having an interior wall. The method further includes inserting a second component, defining a second component passage into which a fluid is circulated for the purposes of removing heat, into the first component passage with force suitable to create a change in the exterior dimension of the first component, thereby causing a thermal connection to be formed between the first component and the interior wall of the second aperture.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings, which show example implementations; and in which.

DESCRIPTION OF THE PEFERRED EMBODIMENT(S)

Recently, vertically oriented stave-type cooling elements have replaced plate-type cooling elements because the stave-type cooling elements are typically less expensive, can remove more heat and are thinner. A thinner cooling element leaves more interior volume in the furnace and allows corresponding increases in production. However, in many installations, stave-type cooling elements have become damaged within 10 years of installation from excessive abrasive wear of the interior hot-face. The shorter life of stave-type cooling elements, relative to plate coolers, can be, at least partially, attributed to their reduced ability to retain a protective layer of stagnant burden on the front surface of the cooler, i.e., the hot surface exposed to the interior of the furnace. This results in increased wear and thermal cycling, both of which can shorten the life of the cooler.

Stave designs incorporating protruding ledges or cylinders to retain accretion have been developed to better retain burden; however, these ledges wear out, necessitating a stave repair or replacement. Some designs have included protruding hot-face features which can be replaced when worn away. One such design is disclosed in International Publication No. WO 2012/107322 A1, published on Aug. 16, 2012. The increased turbulence caused by the protruding shafts is believed to slow down the deterioration of the stave cooler by helping to build and maintain the accretion layer on the hot face of the cooler. The shafts disclosed in this publication have an essentially circular cross-section and may protrude through cylindrical or conical holes formed in the body of the stave cooler.

Stave-type coolers can be difficult to replace from outside of a furnace. As a result, a furnace may need to be shut-down and drained before coolers can be replaced. To avoid such costly and lengthy shutdowns, instead of replacing damaged cooling elements, it is common to install additional supplementary cooling elements from the exterior of the furnace through cut/drilled holes. It is common for these supplementary coolers to be rectangular (plates) or cylindrical in shape and to protrude beyond the face of the failed cooling element to anchor a protective accretion layer. While these supplementary coolers provide localized cooling at their tip, they remove minimal heat from the stave-type cooler itself. The quantity of supplementary coolers which can be installed through a furnace wall is typically limited by access or structural constraints. The limited number of supplemental coolers typically only covers a fraction of the furnace wall area and do not provide an equivalent level of cooling as the original stave-type cooler which covered the entire wall. This reduction in cooling capacity can adversely affect the furnace process and production.

There remains a need to provide a supplemental cooler which can effectively remove heat from a stave-type cooler and thus provide increased cooling performance covering an increased area of the furnace wall.

According to an aspect of the present disclosure, there is provided a cooling element (cooler) comprised of two or more components. These components can be adjusted so that the relative movement of one or more of the sub-components creates a change in the exterior dimension/shape/envelope of the cooler. This change in dimension/shape/envelope causes a thermal connection to be formed with a contiguous cooler.

According to another aspect, at least one of the sub-components of the cooler may have a tapered profile. The movement of one or more of the cooler sub-components relative to this taper causes the cooler to expand outwardly and create thermally conductive contact with a contiguous cooler.

According to another aspect, one of the sub-components is cylindrical and incorporates a tapered section and a surrounding sleeve/collet with a matching taper. The cooler is intended to be inserted into a hole in the 'host' cooler. Provision is made to adjust the cooler so that the sleeve moves along the tapered section of the cylindrical element and is forced to expand outwards. Outward expansion of the cooler causes it to apply pressure on a hole in a "host" cooler and, in doing so, create a thermally conductive joint between the inserted cooler and host cooler.

According to another aspect, one of the sub-components incorporates a tapered section and one or more additional sub-components with a matching taper. Provision is made to adjust the cooler so that the tapered sub-components move relative to each other along causing the exterior of the cooler to expand outwards. Outward expansion of the cooler causes it to apply pressure on a slot in a "host" cooler and, in doing so, create a thermally conductive joint between the inserted cooler and host cooler.

According to another aspect, one or more springs are incorporated into the cooler to force sub-components to move relative to each other until one or more of the sub-component creates thermally conductive contact with a contiguous cooling element. The force applied by the spring improves the thermal contact at the joint between the contiguous coolers. If the joint between the contiguous cooling element moves or changes shape during the operation of the furnace, then the spring force will cause further movement of one or more of the sub-components to maintain thermal contact.

The following embodiments relate to replaceable cooling elements for installation in a new or existing stave cooler for a blast furnace having an outer steel shell. These cooling elements are referred to below as "supplemental cooling elements" because they supplement the cooling provided by the existing stave cooler. It will, however, be appreciated that the supplemental cooling elements described herein can be installed in any new or existing stave cooler, regardless of the type of furnace in which it is installed.

The supplemental cooling elements described herein are replaceable from outside the furnace, through cut/drilled holes in the furnace shell and the stave cooler. This allows the supplemental cooling elements to be removed and/or installed during operation of the furnace. The ability to replace damaged cooling elements and/or install additional supplementary cooling elements from the exterior of the furnace helps to improve and/or maintain the performance of the stave cooler over time, thereby extending the life of the stave cooler and reducing the need to shut down and drain the furnace for cooler replacement.

Because the furnace shell is a structural member, the number of supplemental cooling elements that can be installed through the furnace wall, and the percentage of wall area that they cover, is limited. The proportion of the furnace wall that is cooled can be increased by making effective use of the pre-existing stave coolers to absorb heat and conduct this heat to the supplemental cooling elements, which extend through the furnace wall. Therefore, effective heat conduction provided between the body of the existing stave cooler and the supplemental cooling elements allows for an effective transfer of heat from the stave cooler to the supplemental cooling elements, thereby removing this excess heat from the furnace.

Effective conduction of heat is also valuable where an array or set of supplemental cooling elements removes heat from one or more stave coolers, since it effectively provides a thermal connection between the cooling elements making up the set. An arrangement of thermally connected coolers is more robust in that it maintains effective cooling of the furnace wall in the event that an individual cooling element is damaged or the flow of cooling medium to one cooling element is interrupted.

Cooling elements according to specific embodiments are now described with reference to the drawings. In the following description, the terms "inner" and "outer" refer to locations of components and surfaces relative to one another and to the interior of the furnace, such that an "inner" component or surface is located closer to the centre of the furnace than one or more "outer" components or surface. Also, the term "interior", when used in relation to a component or surface, indicates that the component or surface is located inside the furnace, whereas the term "exterior" indicates that a component or surface is located outside the furnace.

Figure 1A:
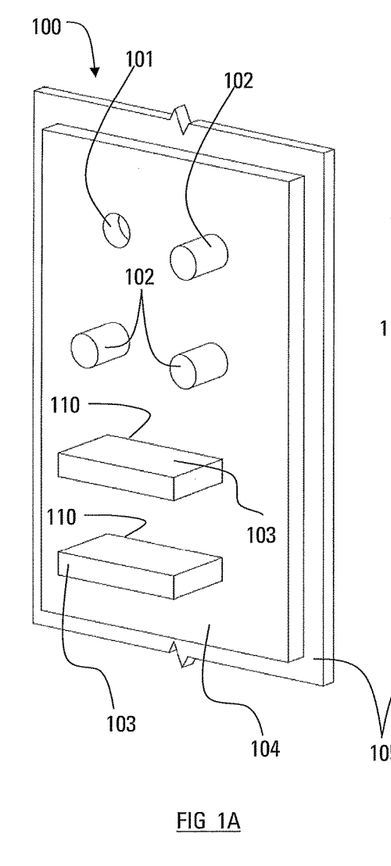
FIG. 1A illustrates a front perspective view of a stave cooler incorporating a plurality of cooling elements according to embodiments disclosed herein.
Figure 1B:
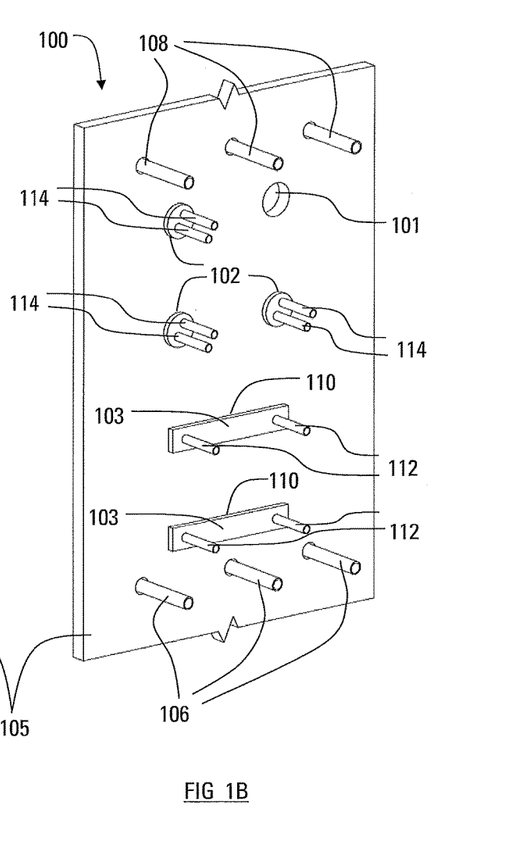
FIG. 1B illustrates respective a rear perspective view of the stave cooler illustrated in FIG. 1A.

FIGS. 1A and 1B schematically illustrate a portion of a furnace wall assembly 100. The interior of wall assembly 100 is shown in FIG. 1A, and the exterior of wall assembly 100 is shown in FIG. 1B. The wall assembly 100 comprises an inner, vertical stave cooler 104 (also referred to herein as the "host cooler 104") and an outer structural steel shell plate 105. The furnace wall assembly 100 may comprise the wall of a blast furnace, for example, and a refractory layer (not shown in FIG. 1) may be provided on the interior surface of the shell plate 105, between the shell plate 105 and stave cooler 104. The furnace wall assembly 100 may be cylindrical, in the case of a circular furnace, or may be flat in the case of a rectangular furnace.

Although not shown in FIG. 1, the inner face of the stave cooler 104 may be provided with a series of horizontal ridges and grooves, for example as disclosed in the above-mentioned International Publication No. WO 2012/107322 A1, to assist in maintaining a protective accretion layer over the exposed surfaces of the stave cooler 104. In order to more clearly show the features of the stave cooler 104 and the cooling elements, the accretion is not shown in the drawings.

The stave cooler 104 is in the form of a rectangular plate that is arranged vertically against the inner surface of the furnace shell 105, and may include a plurality of internal coolant passages (not shown). Where the stave cooler 104 has internal coolant passages, it will have one or more coolant inlet openings and one or more coolant outlet openings, the coolant inlet and outlet openings being provided with fittings for connection to a coolant circulation system (not shown). The coolant is typically liquid, for example water. FIG. 1B shows the stave cooler 104 as having a plurality of coolant inlet fittings 106 and a plurality of coolant outlet fittings 108 arranged at opposite ends of the stave cooler 104. The coolant fittings 106, 108 are in the form of cylindrical tubes protruding from the outer surface of the stave cooler 104 (i.e., the surface that faces the shell plate 105). The fittings 106, 108 protrude through apertures in the shell plate 105 and, therefore, extend to the exterior of the furnace. Where the inner face of a stave cooler has been significantly eroded, it is possible that the coolant supply to stave cooler 14 may have been discontinued to avoid leakage of coolant into the furnace interior.

The furnace wall system 100 includes a plurality of cylindrical cooling elements 102 received in cylindrical through-holes 101, which extend through the stave cooler 104 and the shell plate 105 from the interior to the exterior of the furnace wall assembly 100. The furnace wall system 100 also includes a plurality of plate-type cooling elements 103 received in rectangular slots 110 extending through the stave cooler 104 and the shell plate 105 from the interior to the exterior of the furnace wall assembly 100. The cylindrical cooling elements 102 and plate-type cooling elements 103 are sometimes referred to collectively herein as the "supplemental cooling elements". Although the wall system of FIGS. 1A and 1B is shown as having both cylindrical and plate-type cooling elements 102, 103, it will be appreciated that this is not necessary. Rather, it is possible that the wall system includes only one of these types of supplemental cooling elements.

Each of the supplemental cooling elements 102, 103 has in inner end which protrudes from the inner surface of the stave cooler 104 into the interior of the furnace, and an outer end which is accessible and/or protrudes from the outer surface of the shell plate 105, toward the exterior of the furnace. The inner ends of the supplemental cooling elements 102, 103 protrude from the inner surface of the stave cooler 104 by a sufficient amount to promote the formation of an accretion or stagnant layer of burden along the inner face of the cooling stave 104, in order to protect the stave cooler 104 from excessive heat and corrosion caused by direct exposure to the high temperatures and corrosive environment in the interior of the furnace.

As further discussed below, a liquid coolant such as water, may also be circulated through the supplemental cooling elements 102, 103. In this regard, the supplemental cooling elements 102, 103 may be provided with coolant inlet and outlet openings, and with fittings for connection to a coolant circulation system (not shown), possibly the same circulation system which circulates coolant through the stave cooler 104. For example, FIG. 1B shows each of the plate-type coolers 103 having a pair of coolant fittings 112 protruding from the outer end of the cooling element 103 to the exterior of the furnace and, similarly, FIG. 1B shows each of the cylindrical cooling elements 102 having a pair of coolant fittings 114 protruding from the outer end of the cooling element 102 to the exterior of the furnace.

Figure 2:
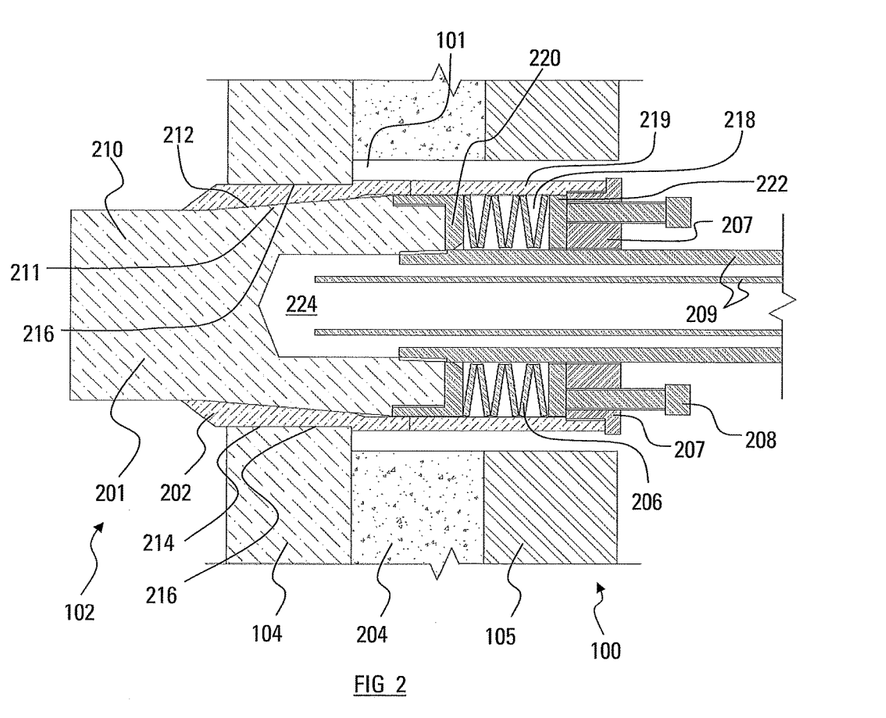
FIG. 2 is a cross-sectional side view of a cooler according to an embodiment described herein, installed in a host cooler.
Figure 4:
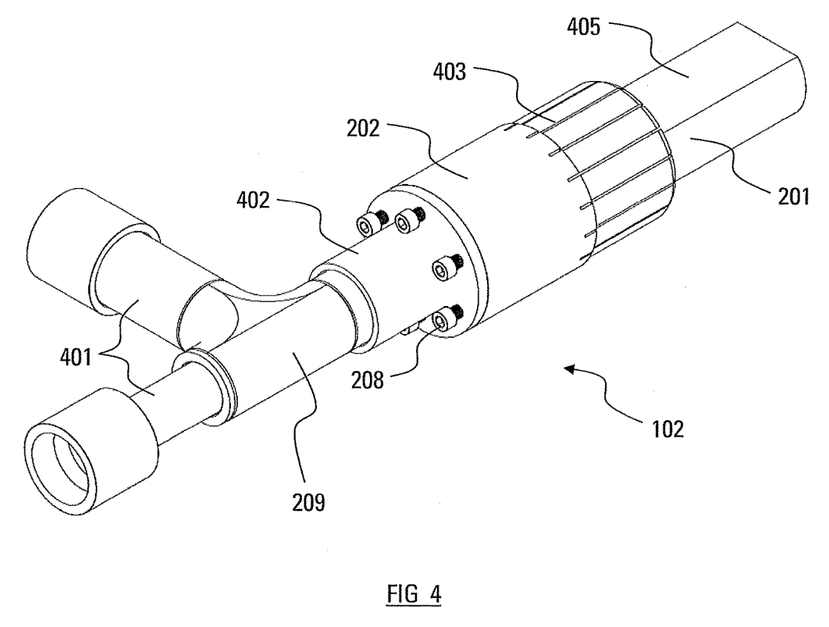
FIG. 4 is a perspective view of the cooler of FIG. 2, separated from the host cooler.

FIGS. 2 and 4 provide more detailed views of the cylindrical cooling element 102 of FIG. 1. The cylindrical cooling element 102 is shown in the cross-section of FIG. 2 as being received in the cylindrical through-hole 101 of the furnace wall system 100 comprising the outer shell plate 105, the inner stave cooler 104, and a layer of refractory material 204 between the shell plate 105 and the stave cooler 104. As in the embodiment shown in FIGS. 1A and 1B, the inner end of the cooling element 102 protrudes from the inner surface of the stave cooler 104 into the interior of the furnace and the outer end of cooling element 102 is accessible and/or protrudes from the outer surface of the shell plate 105, toward the exterior of the furnace.

The cylindrical cooling element 102 has a structure which provides a thermally conductive connection between the cooling element 102 and the stave cooler 104. In this regard, the cylindrical cooling element 102 has a first cylindrical component 201 having an elongate sidewall with a tapered conical outer surface section 211 extending along at least part of its length, the taper causing the first cylindrical component to decrease in diameter toward the interior of the furnace. The first cylindrical component 201 is concentrically received inside a second cylindrical component 202, which is in the form of an annular sleeve or collar. The second cylindrical component 202 has an elongated sidewall with a tapered conical inner surface section 212 matching the taper of the tapered surface section 211 of the first cylindrical component 201. The matching tapered faces 211, 212 of the cylindrical components 201, 202 provide thermal contact between these components, as further described below.

The cylindrical through-hole 101 is shown as having a first diameter through the stave cooler 104 and a second, larger diameter through both the refractory layer 204 and the shell plate 105. The smaller diameter portion of through-hole 101 through the stave cooler 104 is sized such that the inner cylindrical surface 214 of the through-hole 101 in stave cooler 104 is in thermal contact with a cylindrical outer surface section 216 extending along at least part of the length of the second cylindrical component 202.

The components 201, 202 and the stave cooler 104 may be made from the same or different thermally conductive metal, such as copper or a copper alloy.

Adequate thermal contact between components 201, 202 and stave cooler 104 requires more than a simple friction fit between these components. Accordingly, the cooling element 102 includes means for pushing the first cylindrical component 201 into the second cylindrical component 202, causing the tapered sections 211, 212 to move relative to one another and causing the second cylindrical section 202 to expand in diameter, such that the cylindrical outer surface section 216 of the second cylindrical component exerts a radial force (also referred to herein as a "lateral force") against the inner cylindrical surface 214 of the through-hole 101. For example, where the components 201, 202 and the stave cooler 104 are formed from copper or an alloy thereof, that a thermal contact conductance of above about 10 kW/m$^{2\circ}$ C. between copper components may, in some cases, provide sufficient thermal conductance between the components. The inventors have also found that a higher contact conductance in the range from about 50 kW/m$^{2\circ}$ C. to about 150 kW/m$^{2\circ}$ C. may be achieved by a radial force of about 5 MPa, exerted outwardly on the inner cylindrical surface 214 of the through-hole 101. These values of conductance and force are exemplary only, and it will be appreciated that the desired level of radial force needed to achieve adequate contact conductance will depend on a number of factors, including the surface finishes of the components 201, 202 and the surface finish of the inner cylindrical surface 214 of the through-hole 101.

As mentioned above, the diameter of the second cylindrical component 202 is forced to expand radially as the first cylindrical component 201 is pushed further into the second component 202. This expansion can be facilitated by forming the second cylindrical component 202 as a collet or sleeve with a plurality of longitudinally extending slits 403 as shown in FIG. 4.

The force necessary to expand the second cylindrical component 202 is provided by one or more disk springs 206 or Belleville washers. The springs 206 are received in an annular space 218, enclosed within a cylindrical outer end portion 219 of the second cylindrical component 202, the annular space 218 extending longitudinally between a flat surface 220 on the outer end of the first cylindrical component 201 and an annular washer 222 located inwardly of a cylindrical cap 207 which is fitted inside the cylindrical outer end portion 219 of the second cylindrical component 202. The cap 207 may be formed of steel, such as stainless steel, as may be the flat surface 220 of the first cylindrical component 201. The force exerted on the first cylindrical component 201 by the springs 206 may be adjusted by bolts 208, which are threaded into the cap 207 and which protrude outwardly from the outer end of the cylindrical cooling element 102. In use, the springs maintain a substantially constant pressure on the first cylindrical component 201, thereby maintaining substantially constant thermal conductivity between the cylindrical cooling element 102 and the stave cooler 104.

To provide an added thermal connection between cylindrical cooling element 102 and the stave cooler 104, the refractory layer 204 may comprise a thermally conductive grout.

As mentioned above, a liquid coolant may be circulated through the cylindrical cooling element 102. In this regard, the first cylindrical component 201 is provided with a longitudinally extending coolant flow passage 224. The coolant flow passage 224 is in the form of a cylindrical bore extending from the flat surface 220 on the outer end of the first cylindrical component 201 toward the inner end of the cylindrical cooling element 102. However, it will be appreciated that the coolant flow passage 224 has a length such that it does not substantially extend through the hole 101 to the inner surface of the stave cooler 104. Therefore, as the inner end portion of the cylindrical cooling element 102 is eroded by contact with the descending furnace burden inside the furnace, there is little or no possibility that the coolant flow passage 224 will become exposed to the furnace environment and coolant will leak into the furnace interior.

Rather than having two separate inlet and outlet openings, the coolant flow passage 224 of cylindrical cooling element 102 has a single opening which receives a pair of concentric pipes 209, such that one of the inlet/outlet passages is defined by the annulus between the pipes 209, and the other is defined by the interior of the central inner pipe 209. The inlet and outlet pipes 209 pass outwardly from the exterior of the furnace wall assembly 100 through the cap 207. As shown in FIG. 4, the exterior portion of the concentric pipes 209 may be branched at 401 to provide separate coolant inlet and outlet fittings.

As also shown in FIG. 4, the inner portion of the first cylindrical component 201, which will project inwardly of the stave cooler 104 (not shown in FIG. 4), does not necessarily have a cylindrical shape. For example, as shown in FIG. 4, the upper surface 405 of the inner portion of the first cylindrical component 201 may be shaped so as to be flat, so as to better retain the stagnant burden or accretion over the inner surface of the stave cooler 104.

FIG. 4 also illustrates a reinforced form of collar 207, having a longitudinally extending sleeve 402 surrounding a portion of the concentric pipe 209, to protect and strengthen the connection between the pipe 209 and collar 207.

Figure 3:
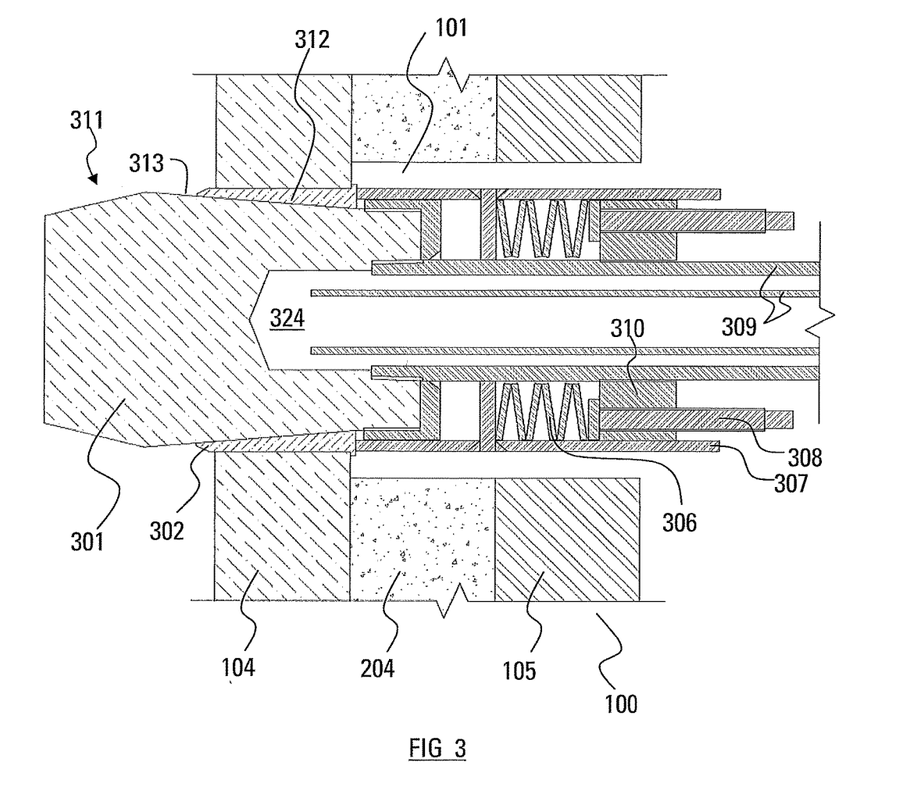
FIG. 3 is a cross-sectional side view of a cooler according to an embodiment described herein, installed in a host cooler.

FIG. 3 illustrates a sectional view of a cylindrical cooling element 311 according to another embodiment of the invention. The cylindrical cooling element 311 is similar to cylindrical cooling element 102 described above, except as noted below.

The cylindrical cooling element 311 is received in a cylindrical through-hole 101 of the furnace wall system 100 comprising the outer shell plate 105, the inner stave cooler 104, and the layer of refractory material 204 between the shell plate 105 and the stave cooler 104. As in the embodiment shown in FIGS. 1A and 1B, the inner end of the cooling element 311 protrudes from the inner surface of the stave cooler 104 into the interior of the furnace, and the outer end of the cooling element 311 is accessible and/or protrudes from the outer surface of the shell plate 105, toward the exterior of the furnace.

The cylindrical cooling element 311 has a first cylindrical component 301 having an elongate sidewall with a tapered conical outer surface section 313 extending along at least part of its length, the taper causing the first cylindrical component to decrease in diameter toward the exterior of the furnace. The first cylindrical component 301 is concentrically received inside a second cylindrical component 302, which is in the form of an annular sleeve or collar, and which may have longitudinal slots similar to collet 403 shown in FIG. 4. The second cylindrical component 302 has an elongate sidewall with a tapered conical inner surface section 312 matching the taper of the tapered surface section 313 of the first cylindrical component 201, also decreasing in diameter toward the exterior of the furnace.

In the embodiment of FIG. 3, the first cylindrical component 301 is pulled toward the exterior of the furnace wall assembly 100 (i.e., to the right in FIG. 3) through the second cylindrical component 302 by springs 306 or Belleville washers acting through a sleeve 307. The force exerted by the springs can be adjusted by bolts 308 protruding through the cap 310. As in the embodiment of FIGS. 2 and 4, a pair of concentric tubes 309 extend through the cap 310 into a cylindrical coolant flow passage 324 provided in the first cylindrical component 301.

It can be seen from FIG. 3 that the coolant flow passage 324 has a length such that it does not substantially extend through the hole 101 to the inner surface of the stave cooler 104. Therefore, as the inner end portion of the cylindrical cooling element 102 is eroded by contact with the descending furnace burden inside the furnace, there is little or no possibility that the coolant flow passage 324 will become exposed and coolant will leak into the furnace interior. This is the same arrangement as described above with reference to the embodiment of FIGS. 2 and 4.

Figure 5:
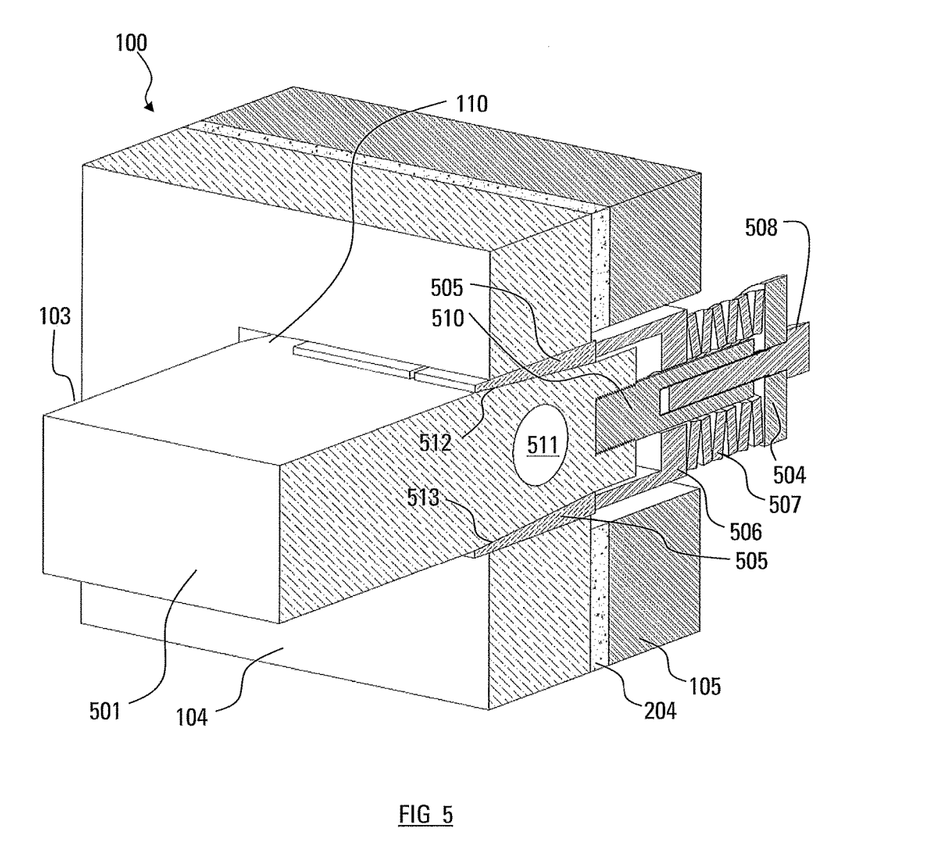
FIG. 5 is a cross-sectional perspective view of a cooler according to an embodiment described herein, installed in a host cooler.

FIG. 5 provides a more detailed view of the plate-type cooling element 103 shown in FIG. 1A and FIG. 1B. The plate-type cooling element 103 is received in a rectangular slot 110 in the furnace wall system 100, comprising the outer shell plate 105, the inner stave cooler 104, and the layer of refractory material 204 between the shell plate 105 and the stave cooler 104. As in the embodiment shown in FIGS. 1A and 1B, the inner end of the plate-type cooling element 103 protrudes from the inner surface of the stave cooler 104 into the interior of the furnace, and the outer end of the plate-type cooling element 103 is accessible and/or protrudes from the outer surface of the shell plate 105, toward the exterior of the furnace.

The plate-type cooling element 103 has a first component 501 having a rectangular cross section slightly smaller than that of the rectangular slot 110 in the furnace wall system 100. The length of the first component 501 is defined in the longitudinal direction, parallel to the plane of the cross-section of FIG. 5 and parallel to the direction in which the slot 110 penetrates the wall system 100. As shown in FIG. 5, the first component 501 includes an exterior section having a trapezoidal cross section that tapers inwardly along at least part of its length, with the taper causing the top and bottom surfaces 512, 513 of the first component 501 to taper toward one another in the direction of the exterior of the furnace. In place of a second component, a pair of wedge-shaped elements 505 is provided along the top and bottom surfaces 512, 513 of the first component 501. The pair of wedge-shaped elements 505 each have a tapered inner surface matching the taper of the top and bottom surfaces 512, 513 of the first component 501.

In a manner similar to the embodiment shown in FIG. 3, the first component 501 is pulled toward the exterior of the furnace wall assembly 100 (i.e., to the right in FIG. 5), relative to the wedge-shaped elements 505, by springs 507 or Belleville washers acting through a sleeve 506. The force exerted by the springs 507 can be adjusted by bolts 508 protruding through a cap 504 which retains the springs 507, only one bolt 508 being visible in FIG. 5. It will be appreciated that there may be a plurality of bolts 508 spaced apart across the width of the first component 501. As shown, the bolt 508 may be formed in two parts, including a threaded insert 510 which has an externally threaded end which is permanently threaded into a threaded bore of the first component 501. The threaded insert 510 also includes a threaded bore into which bolt 508 is threaded. The force exerted by the springs 507 may be adjusted by turning the bolt 508 within the threaded insert 510. This arrangement is preferred over threading the adjustment bolt 508 directly into the first component 501, particularly where the bolt 508 is steel and the component 501 is comprised of copper.

FIG. 5 shows a coolant flow passage 511 extending width-wise through the first component 501 of the cooling element 103, it being appreciated that the coolant flow passage 511 will have one or more coolant inlet and outlet openings, with coolant fittings 112 (not shown in FIG. 5) extending to the exterior of the furnace and being accessible. As in the embodiments described above, the coolant flow passage 511 is located within the first component 501 such that it does not substantially extend past the inner surface of the stave cooler 104.

Figure 6:
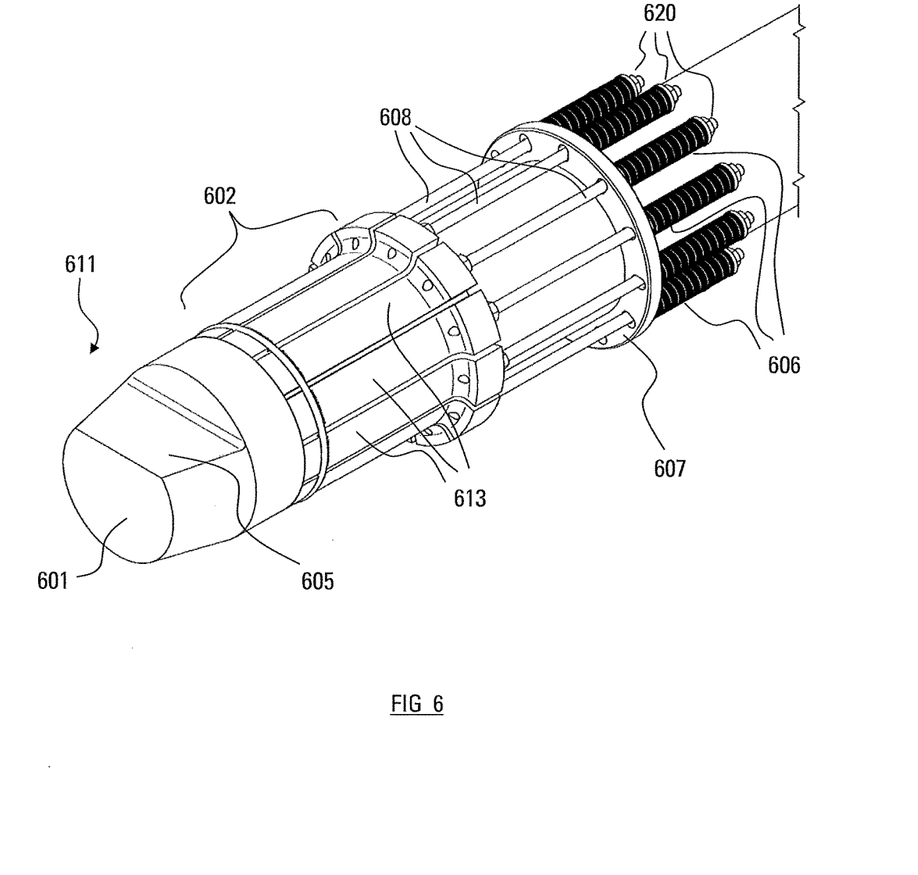
FIG. 6 is a perspective view of a cooler according to an embodiment described herein, installed in a host cooler.

FIG. 6 illustrates a detailed view of a cylindrical cooling element 611 according to another embodiment of the invention. The cylindrical cooling element 611 is similar to cylindrical cooling element 311 described previously, except as noted below.

The cylindrical cooling element 611 has a first cylindrical component 601 having an elongated sidewall with a tapered conical outer surface section extending along at least part of its length, the taper causing the first cylindrical component 601 to increase in diameter toward the exterior of the furnace.

A second cylindrical component 602, which is in the form of an annular sleeve assembly, containing an array of individual fingers 613 around the circumference, may have longitudinal slots similar to the collet 403 shown in FIG. 4. The second cylindrical component 602 may be placed concentrically around the first cylindrical component 601. Each finger 613 contains a tapered inner surface section (not shown) that matches the taper of the inner tapered conical surface section of the first cylindrical component 601, also increasing in diameter toward the exterior of the furnace.

In the embodiment of FIG. 6, the fingers 613 of the second cylindrical component 602 can be moved toward the exterior of the furnace wall assembly 100 (i.e., to the right in FIG. 6) over the first cylindrical component 601 by springs 606 or Belleville washers acting through a flanged outer end 607 of the first cylindrical component 601. The force exerted by the springs 606 can be adjusted by tensioning bolts 608 that are protruding through the flanged outer end 607 and connected to the end of each finger 613. The exertion may be accomplished by tightening tensioning nuts 620 located at the ends of the tensioning bolts 608 distal from the fingers 613. As each tensioning nut 620 is tightened, the individual finger 613 attached to the other end of the tensioning bolt 608 is pulled away from the furnace, causing the finger 613 to move upwards along the inner tapered conical surface section of the first cylindrical component 601, causing the individual finger 613 to expand outwards.

As in the embodiment of FIGS. 2, 3 and 4, a pair of concentric tubes (not shown) extend through the flanged outer end 607 into a cylindrical coolant flow passage provided in the first cylindrical component 601. As in the previous embodiments, the coolant flow passage has a length such that it does not substantially extend through the hole 101 to the inner surface of the stave cooler 104. Therefore, as the inner end portion of the second cylindrical component 602 is eroded by contact with the descending furnace burden inside the furnace, there is little or no possibility that the coolant flow passage will become exposed and coolant will leak into the furnace interior. This is the same arrangement as described above with reference to the embodiment of FIGS. 2 and 4.

The individual fingers 613 of the embodiment shown in FIG. 6 can be tensioned individually and, as a result, allow the cooling element 611 to conform to through-holes 101 of the furnace wall system 100 of an irregular cross section, providing enhanced conductive contact that would not be permitted with cooling elements containing a symmetrical cross section.

Figure 7:
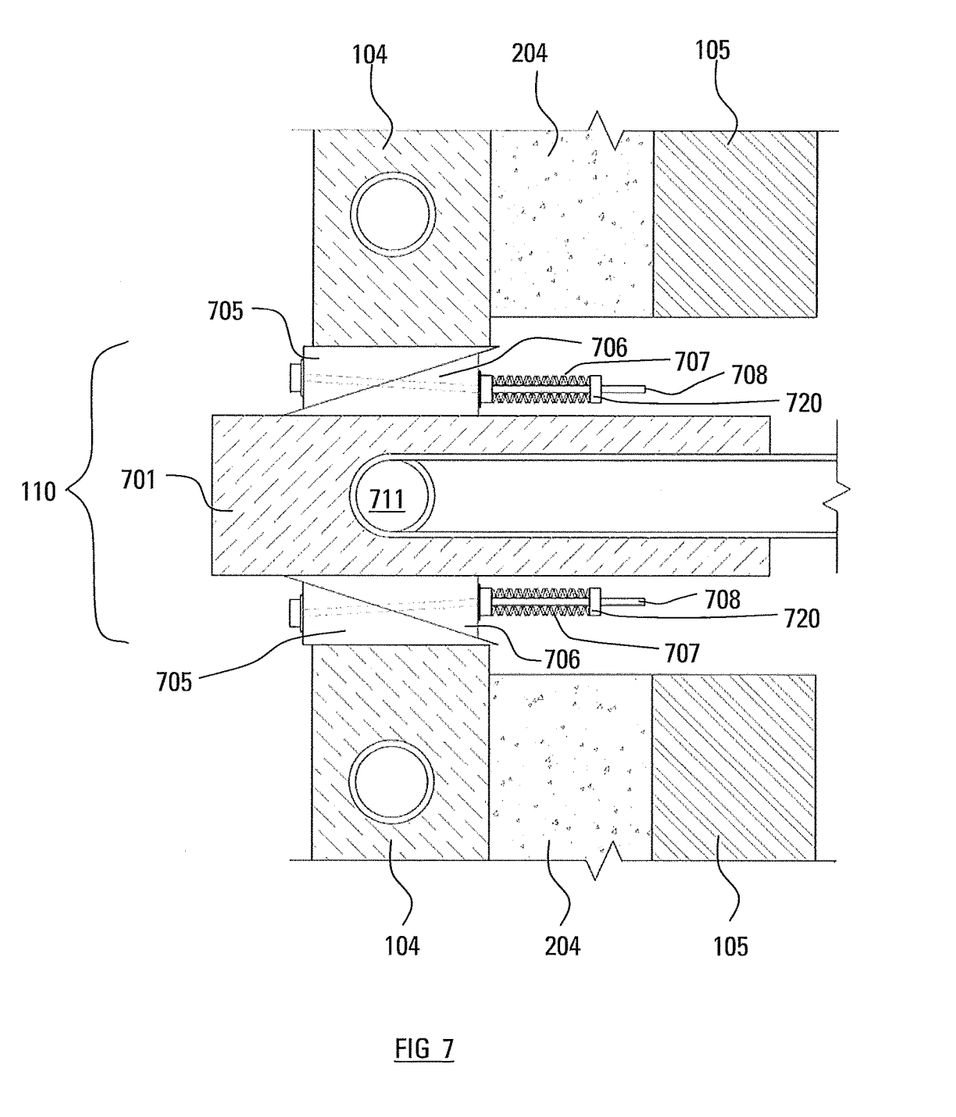
FIG. 7 is a cross-sectional perspective view of a device according to an embodiment described herein, installed in a host cooler.

FIG. 7 illustrates a sectional view of a plate cooling element 701 according to another embodiment of the invention.

The plate-type cooling element 701 is received in a rectangular slot 110 in the furnace wall system 100, comprising the outer shell plate 105, the inner stave cooler 104, and the layer of refractory material 204 between the shell plate 105 and the stave cooler 104. As in the embodiment shown in FIGS. 1A and 1B, the inner end of the plate-type cooling element 701 protrudes from the inner surface of the stave cooler 104 into the interior of the furnace, and the outer end of the plate-type cooling element 701 is accessible and/or protrudes from the outer surface of the shell plate 105, toward the exterior of the furnace.

The plate-type cooling element 701 has a rectangular cross section slightly smaller than that of the rectangular slot 110 in the furnace wall system 100. The length of the plate-type cooling element 701 is defined in the longitudinal direction, parallel to the plane of the cross-section of FIG. 7 and parallel to the direction in which the slot 110 penetrates the wall system 100. As shown in FIG. 7, the plate-type cooling element 701 includes an exterior section having a rectangular cross section. To form a thermally conductive pressure connection between the first component, a series of assemblies including a pair of wedge-shaped components, 705 and 706, is provided along the top and bottom surfaces of the plate-type cooling element 701. The pair of wedge-shaped components, 705 and 706, each has a matching tapered inner surface. The two wedge-shaped components, 705 and 706, may be connected together using a tie rod 708.

In a manner similar to the embodiment shown in FIG. 5, the first wedge-shaped component 705 can be pulled toward the second wedge-shaped component 706, by springs 707 or Belleville washers inserted through the tie rod 708. The force exerted by the springs 707 can be adjusted by a tensioning nut 720, which is adapted for adjustable placement along the bolt 708 to retain the springs 707, only one bolt 708 being visible per side of the plate-type cooling element 701 in FIG. 7. It will be appreciated that there may be a plurality of bolts 708 spaced apart across the width of both sides (top-side, bottom-side) of the plate-type cooling element 701.

FIG. 7 shows a coolant flow passage 711 extending width-wise through the plate-type cooling element 701, it being appreciated that the coolant flow passage 711 will have one or more coolant inlet and outlet openings, with coolant fittings 712 (not shown in FIG. 7) extending to the exterior of the furnace and being accessible. As in the embodiments described above, the coolant flow passage 711 is located within the plate-type cooling element 701 such that it does not substantially extend past the inner surface of the stave cooler 104.

The embodiment shown in FIG. 7 decouples the wedge and cooling element. It can be appreciated that there may be one set of wedge-shaped components 705 and 706, per side, or there may be a plurality of wedge assemblies inserted between each face of the plate-type cooling element 701 and the inner surfaces of the stave cooler 104 It can also be appreciated that the sizes of the wedge-shaped components may be different on each side of the plate-type cooling element 701. This allows the thermally conductive contact pressure, via wedge-shaped components 705 and 706, between each contact face of the plate cooling element 701 and inner face of the stave cooler 104 to be controlled independently. Furthermore, this allows each set of wedge-shaped components, 705 and 706, to be replaced independently as needed, without removing the entire plate cooling element 701.

The above-described implementations of the present application are intended to be examples only. Alterations, modifications and variations may be effected to the particular implementations by those skilled in the art without departing from the scope of the application, which is defined by the claims appended hereto.

What is claimed is:

1. A supplementary cooling element for use in conjunction with a primary cooling element of a furnace, the supplementary cooling element comprising:
   a first component containing a passage into which a fluid is circulated for the purposes of removing heat, wherein the first component has, at least in part, a tapered profile; and
   a second component defining a passage sized to receive the first component, the second component having an exterior dimension arranged for being received within an aperture in the primary cooling element, the aperture having an interior wall;
   wherein a movement of the first component relative to the second component causes the second component to expand outwardly, thereby causing:
   a thermally conductive pressure joint to be formed between the first component and the second component; and
   a thermally conductive pressure joint to be formed between the second component and the interior wall of the aperture in the primary cooling element.

2. The cooling element of claim 1 wherein the first component comprises a cylinder incorporating a tapered section with the tapered profile.

3. The cooling element of claim 2 wherein the second component comprises a sleeve with a taper that matches the tapered section of the first component.

4. The cooling element of claim 2 wherein the second component comprises a collet with a taper that matches the tapered section of the first component.

5. The cooling element of claim 4 wherein the aperture in the primary cooling element comprises an irregularly-shaped aperture.

6. The cooling element of claim 5 wherein the second component comprises elements adapted to be tensioned individually to allow the second component to conform to the irregularly-shaped aperture.

7. The cooling element of claim 1 further comprising a biasing element configured to exert a force on the first component to force the movement.

8. The cooling element of claim 7 wherein the biasing element comprises a spring.

9. The cooling element of claim 7 wherein the biasing element comprises a plurality of Belleville washers.

10. The cooling element of claim 7 wherein the biasing element is received in an annular space, enclosed within a cylindrical outer end portion of the second component, the annular space extending longitudinally between a flat surface on an outer end of the first component and an annular washer located inwardly of a cylindrical cap, the cylindrical cap being fitted inside the cylindrical outer end portion of the second component.

11. The cooling element of claim 10 wherein the cap comprises steel.

12. The cooling element of claim 1 wherein the cooling element is fabricated from copper or a copper alloy.

13. The cooling element of claim 7 further comprising an adjustment element adapted to alter the force exerted, by the biasing element, on the first component.

14. The cooling element of claim 13 wherein the adjustment element comprises a bolt threaded into the cap and protruding outwardly from an outer end of the cooling element.

15. The cooling element of claim 1 wherein the first component comprises a trapezoidal prism incorporating a tapered section with the tapered profile.

16. The cooling element of claim 15 wherein the second component comprises a pair of wedge-shaped elements.

17. The cooling element of claim 1 wherein the aperture in the primary cooling element comprises a cylindrical aperture.

18. A supplementary cooling element for use in conjunction with a primary cooling element of a furnace, the supplementary cooling element comprising:
- a first component containing a passage into which a fluid is circulated for the purposes of removing heat, wherein the first component has, at least in part, a tapered profile; and
- a second component defining a passage sized to receive the first component, the second component having exterior dimension arranged for being received within an aperture in the primary cooling element, the aperture having an interior wall;
- wherein a movement of the second component along an exterior surface of the first component causes the second component to expand outwardly, thereby causing:
    - a thermally conductive pressure joint to be formed between the first component and the second component; and
    - a thermally conductive pressure joint to be formed between the second component and the interior wall of the aperture in the primary cooling element.

* * * * *